United States Patent
Muzio

[11] Patent Number: 6,123,352
[45] Date of Patent: Sep. 26, 2000

[54] DEVICE FOR SUPPORTING AND POSITIONING A VEHICLE STABILIZING BAR, AND VEHICLE STABILIZING SYSTEM COMPRISING SUCH A DEVICE

[75] Inventor: Carlo Muzio, Ivrea, Italy

[73] Assignee: Rejna S.p.A., Milan, Italy

[21] Appl. No.: 09/114,303

[22] Filed: Jul. 10, 1998

[30] Foreign Application Priority Data

Jul. 11, 1997 [IT] Italy .................................. TO97A0621

[51] Int. Cl.⁷ .................................................... B60G 3/02
[52] U.S. Cl. ................................................... 280/124.152
[58] Field of Search ..................... 280/124.137, 124.149, 280/124.152; 248/58

[56] References Cited

U.S. PATENT DOCUMENTS

| | | | |
|---|---|---|---|
| 3,033,587 | 5/1962 | Perish | 280/124.137 |
| 4,033,605 | 7/1977 | Smith et al. | 280/124.137 |
| 4,192,529 | 3/1980 | Shiratori et al. | 280/124.152 |
| 4,880,318 | 11/1989 | Shibahara et al. | 384/125 |
| 5,102,160 | 4/1992 | Stowe | 280/124.152 |
| 5,290,018 | 3/1994 | Watanabe et al. | 267/293 |
| 5,518,819 | 5/1996 | Shibahara et al. | 428/465 |
| 5,678,845 | 10/1997 | Stuart | 280/124.152 |

FOREIGN PATENT DOCUMENTS

| | | |
|---|---|---|
| 0213543 | 3/1987 | European Pat. Off. . |
| 0405109 | 1/1991 | European Pat. Off. . |
| 0500329 | 8/1992 | European Pat. Off. . |
| 0747246 | 12/1996 | European Pat. Off. . |
| 2657564 | 8/1991 | France . |
| WO 91/09748 | 7/1991 | WIPO . |
| WO 96/05976 | 2/1996 | WIPO . |

*Primary Examiner*—J. J. Swann
*Assistant Examiner*—Christopher Bottorff
*Attorney, Agent, or Firm*—Finnegan, Henderson, Farabow, Garrett & Dunner, L.L.P.

[57] ABSTRACT

A straight portion of a vehicle stabilizing bar is fitted with a supporting device including an antifriction sleeve made of low-friction polymeric material and angularly integral with the straight portion of the bar; an annular pad made of elastomeric material and surrounding the antifriction sleeve; and a connecting member for connecting the bar to a vehicle supporting structure, and which is made in one piece from substantially rigid polymeric material, and has a substantially cylindrical through cavity for housing the annular pad; the annular pad clicks axially onto the connecting member and the antifriction sleeve, and is made angularly integral with the connecting member by means of respective longitudinal projections which engage corresponding grooves formed on an inner lateral surface of the cavity of the connecting member, whereas the antifriction sleeve and the annular pad are connected to each other in frictionally rotating manner.

13 Claims, 2 Drawing Sheets

DEVICE FOR SUPPORTING AND POSITIONING A VEHICLE STABILIZING BAR, AND VEHICLE STABILIZING SYSTEM COMPRISING SUCH A DEVICE

BACKGROUND OF THE INVENTION

The present invention relates to a device, made of polymeric material, for supporting and positioning a vehicle stabilizing bar, and a vehicle stabilizing system comprising such a device.

Stabilizing bars are widely used as elastic components of vehicle suspensions, and substantially provide for elastically connecting the two suspensions of the same vehicle axle to increase the roll rigidity of the suspensions and improve passenger comfort and the road-holding capacity of the vehicle.

A stabilizing bar normally comprises a steel rod substantially parallel to and a given distance from the wheel axle for stabilizing, and having two end arms bent towards the axle and connected to the suspension members by means, say, of connecting rods; and the bar is normally fitted to the vehicle frame by means of two supports along the straight portion of the bar between the end arms.

Supports are known comprising rubber or rubber-metal bushes, and which are fitted by metal connecting brackets to the vehicle body. Besides being relatively heavy by comprising metal components, this type of support does not normally allow the bar to rotate or slide axially inside the support itself, on account of the compressed rubber adhering tightly to the bar.

The best stabilizing results are known to be achieved when the bar is simply twisted and induces no undesired stress on the supports secured to the vehicle frame, while at the same time providing for rapid response at the passenger compartment. In the case of the supports described above, the rubber bushes form an elastic chain defined not only by the steel from which the bar is made, but also by the rubber of the supports, thus increasing the elasticity and impairing the response of the stabilizing system.

By way of a solution, stabilizing systems have been devised in which the bar is connected to the vehicle by supports comprising antifriction sleeves, and which, when twisted, therefore allow the bar to rotate freely with respect to the elastic sleeve, without the sleeve in turn being twisted. Besides being heavy, systems of this sort, however, pose the problem of how to maintain the transverse position of the bar, which the sleeves allow not only to rotate freely, but also to translate with respect to the supports.

One known solution to the problem provides for bending the bar close to the supports so as to form axial-stop elbows. Such a solution, however, subjects the bar to considerable bending stress, which impairs the stabilizing efficiency and response of the bar. In another known solution, the bar is fitted, close to the supports, with axial-stop members made separately and comprising, for example, projections engaging respective seats on the bar. Though effective, this solution involves assembly and cost problems on account of the large number of separate components employed.

SUMMARY OF THE INVENTION

It is an object of the present invention to overcome the aforementioned drawbacks typically associated with known stabilizing bar supports, by providing a supporting device which is effective, cheap and easy to make, easy to assemble and lightweight.

According to the present invention, there is provided a device for supporting and positioning a vehicle stabilizing bar having at least one straight portion, the device comprising a connecting member for connecting said bar to a vehicle supporting structure, and which is made of a substantially rigid material and has a substantially cylindrical through cavity housing said straight portion of the bar; and an annular pad made of elastomeric material and interposed radially between said connecting member and said straight portion of the bar; characterized by also comprising an antifriction sleeve made of a low-friction polymeric material and interference fitted radially to said straight portion of the bar; said antifriction sleeve, said annular pad and said connecting member defining three members at least partially inserted radially inside one another; said annular pad being interposed radially between said connecting member and said antifriction sleeve; and at least two of said three members inserted radially inside one another being snap-on connected axially to each other.

More specifically, said connecting member is a one-piece member made of relatively rigid polymeric material and comprising fastening means for fitment to said vehicle supporting structure, and said through cavity inside which said annular pad is inserted; said device also comprising first axial-stop means for axially arresting said annular pad with respect to said connecting member, and second axial-stop means for axially arresting said antifriction sleeve with respect to said annular pad.

The device according to the invention also comprises angular locking means for angularly locking said annular pad with respect to said connecting member; said annular pad on the other hand being connected, in frictionally rotating manner, to said antifriction sleeve.

The resulting device for supporting and positioning a stabilizing bar is therefore fully effective, is cheap and easy to make, is easy to assemble, and is lightweight to reduce to overall weight of the bar to which it is fitted. In particular, the device according to the invention provides for rotary connection of the bar and connecting member, while at the same time ensuring correct axial positioning of the bar.

Tests have shown the device according to the invention to be capable of withstanding, without moving or breaking, axial loads of up to 150 kg, that is, well in excess of the in-service loads resulting from stress on the bar by the wheels or the vehicle body.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
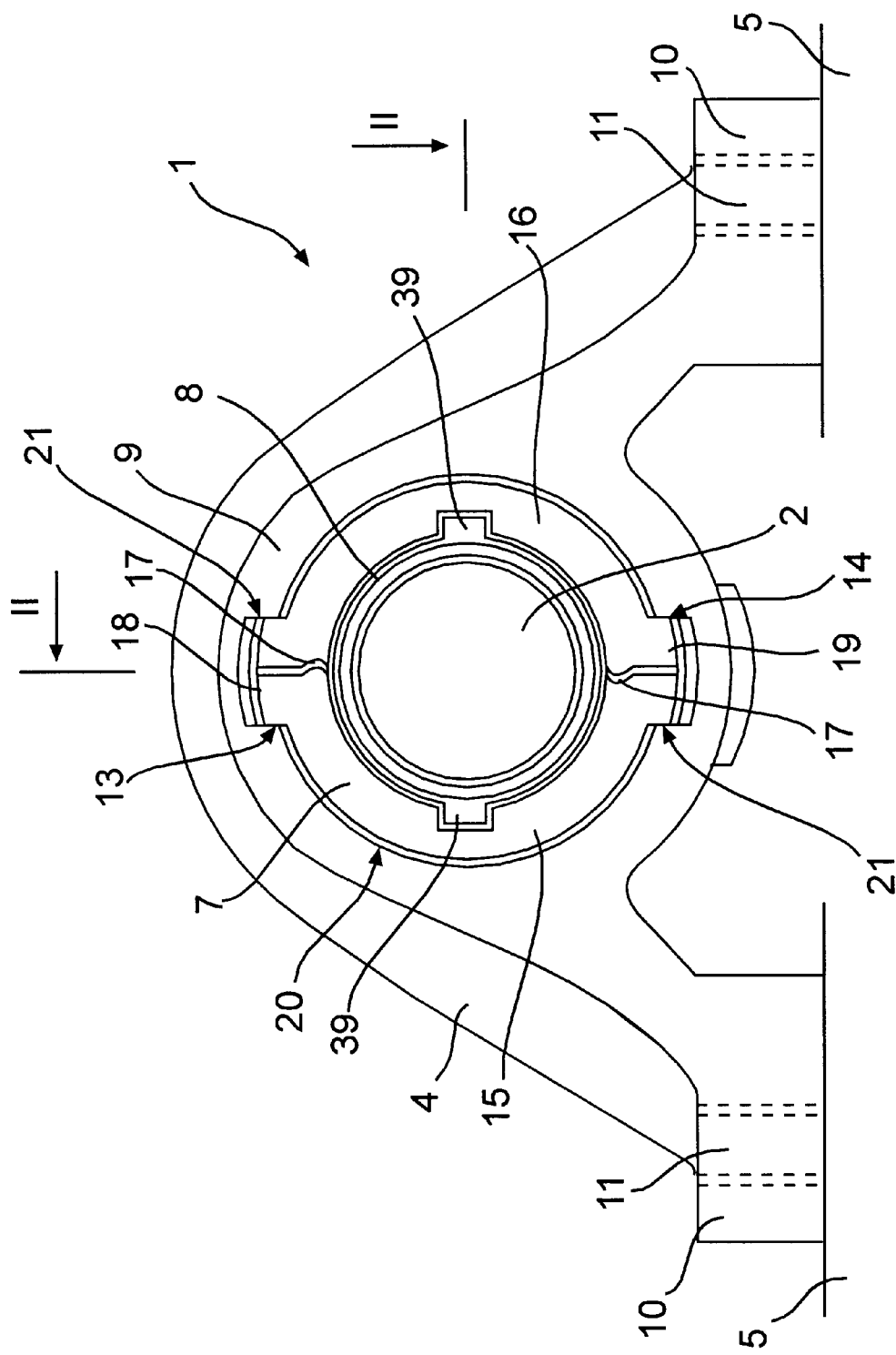
FIG. 1 shows a front view and partial cross section of a device for supporting a stabilizing bar in accordance with the present invention.
Figure 2:
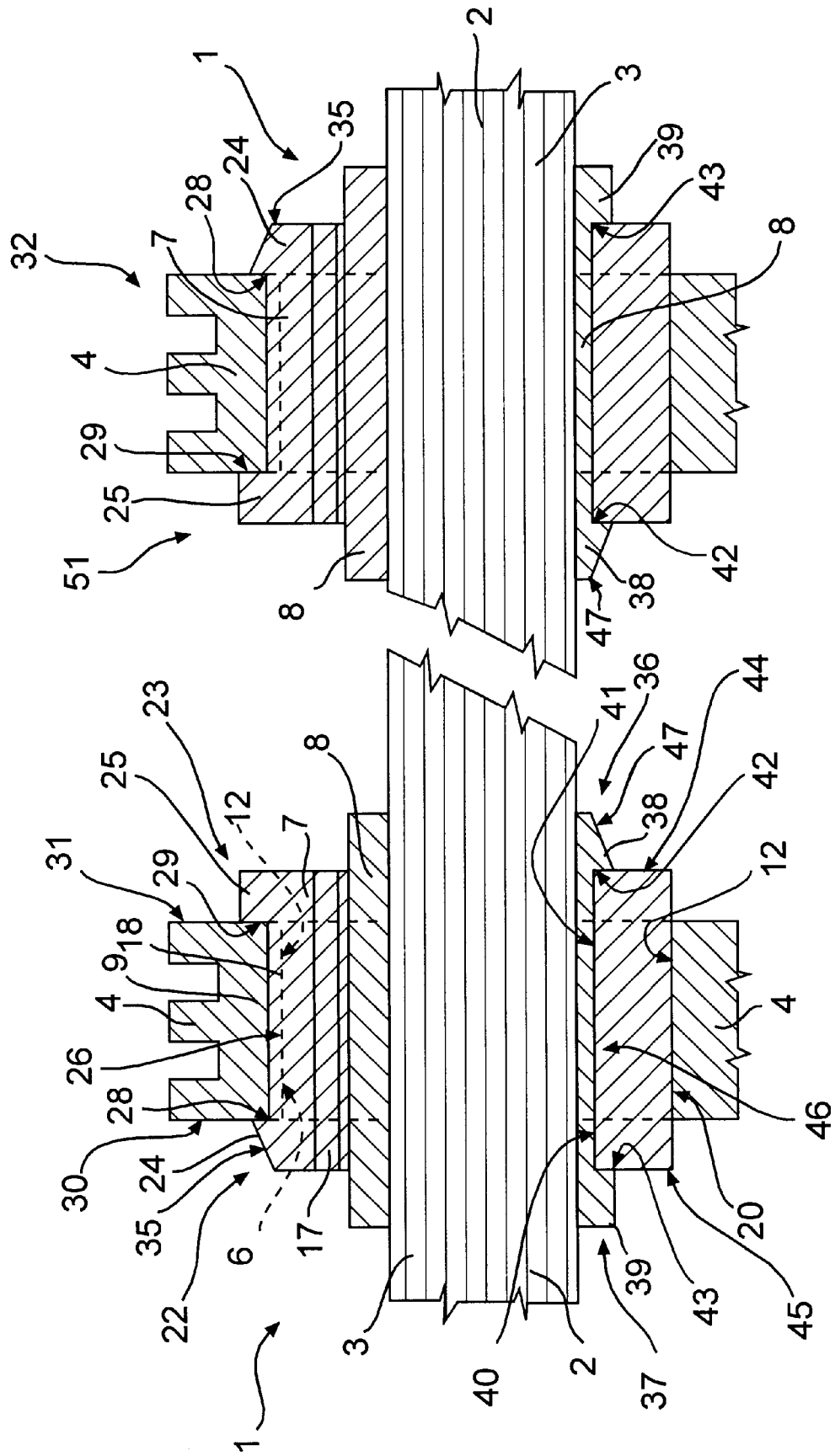
FIG. 2 shows a section along line II—II of the FIG. 1 device.

Number 1 in FIGS. 1 and 2 indicates as a whole a device for supporting and positioning a stabilizing bar 2 of a vehicle (not shown). Bar 2, which is shown only partly in FIG. 2, may be of any form, but in any case comprises at least one straight portion 3 for seating device 1.

Device 1 comprises a connecting member 4 for connecting bar 2 to a supporting structure of the vehicle, e.g. a vehicle body 5, and which is made of substantially rigid polymeric material and has a substantially cylindrical through cavity 6; an annular pad 7 made of elastomeric material or at any rate a relatively elastic polymeric material, and housed inside cylindrical cavity 6 of connecting member 4; and an antifriction sleeve 8 made of low-friction polymeric material and inserted inside annular pad 7 so that the annular pad is interposed radially between connecting member 4 and antifriction sleeve 8.

Connecting member 4 may be of any form and, in the example shown, is substantially in the form of an eye bracket comprising a substantially cylindrical portion 9 in which through cavity 6 is formed, parallel to the longitudinal axis of the cylindrical portion, and from which extend two feet 10 for fitment to vehicle body 5 and having known fastening means 11 defined, for example, by through holes for respective screws.

According to the present invention, connecting member 4 is a one-piece member formed, e.g. molded, from a relatively hard, rigid polymeric material, preferably a polyamide-based commercial copolymer called Durethan™; and a radially inner lateral surface 12 of cavity 6 of connecting member 4 comprises a pair of diametrically opposite longitudinal grooves 13, 14.

Annular pad 7 of elastomeric material may comprise two semicylindrical bodies 15, 16 connected—bonded or welded in known manner—along two diametrically opposite generating lines of the bodies, possibly with the aid of assembly teeth 17 along the mating edges, as in the embodiment shown; or, according to a variation not shown, pad 7 may be formed in exactly the same way but in one piece. Whichever the case, pad 7 comprises a pair of diametrically opposite longitudinal projections 18, 19 projecting radially from a radially outer lateral surface 20 of pad 7; and each of projections 18, 19 engages one of longitudinal groove 13, 14 on the inner lateral surface 12 of cavity 6 to define angular locking means (keys) 21 for locking pad 7 angularly with respect to connecting member 4 and so preventing any angular movement of pad 7 inside cavity 6.

Each projection 18, 19 comprises, at respective longitudinal ends 22 and 23, a pair of facing radial projections 24 and 25, which define an axial seat 26, into which connecting member 4 clicks, and which define a pair of facing axial shoulders 28 and 29 cooperating axially with respective annular end edges 30 and 31 of cylindrical portion 9 of connecting member 4 to define two-way axial-stop means 32 for axially arresting the connecting member with respect to pad 7.

Radial projection 24 at one of longitudinal ends 22 and 23, e.g. at end 22, of each projection 18, 19 is generally lower than projection 25, and has a face bevel 35 facing away from seat 26 so as to define a lead-in by which to click connecting member 4 easily inside the seat.

In the preferred embodiment shown in FIGS. 1 and 2, antifriction sleeve 8 also comprises, at respective longitudinal ends 36 and 37, two pairs of facing radial projections 38, 39 projecting radially from a radially outer lateral surface 40 of sleeve 8; and each pair of radial projections 38, 39 defines an axial seat 41, into which pad 7 clicks, and a pair of facing axial shoulders 42, 43 cooperating axially with respective annular end edges 44, 45 of pad 7 to define axial-stop means 46 for axially arresting the pad with respect to sleeve 8.

Radial projections 38 at end 36 of sleeve 8—opposite longitudinal ends 22 of projections 18 and 19 (having beveled projections 24)—are generally lower than projections 39, and also have respective face bevels 47 facing away from seats 41, and therefore away from bevels 35 of projections 18 and 19 of pad 7, so as to define a lead-in by which to click pad 7 easily inside seats 41. Sleeve 8 is preferably formed in one annular piece, as shown, but may of course, like annular pad 7, be formed in two parts (variation not shown).

Supporting device 1 as described above therefore comprises three members inserted radially one inside another and respectively defined by connecting member 4, annular pad 7 and antifriction sleeve 8. According to the invention, the inside diameter of antifriction sleeve 8 is such that sleeve 8 is fitted to bar 2 with a certain amount of radial interference and is therefore substantially integral with the bar; whereas pad 7 and sleeve 8 are connected in rotary manner to each other. The latter connection may be achieved, for example, by making the inside diameter of pad 7 larger than the outside diameter of sleeve 8, so that pad 7 and sleeve 8 are connected with a certain amount of radial clearance, or, in the case of a more accurate radial fit, by appropriately selecting the materials. In particular, pad 7 is preferably made of Desmopan™ (polyurethane rubber with a Shore A hardness of less than 100), and sleeve 8 of Durethan™ (copolymer of polyamide 6 and 66).

In a preferred embodiment, sleeve 8 is connected integrally to bar 2 by molding sleeve 8 directly onto straight portion 3 of bar 2, so that sleeve 8 is angularly and axially integral with bar 2; and pad 7, as stated, is made angularly integral with connecting member 4 by the angular locking means 21 defined by projections 18, 19 and grooves 13, 14.

As such, connecting member 4, pad 7 and sleeve 8 may be made easily, cheaply and separately in known manner, and then fitted just as easily and cheaply to one another and to stabilizing bar 2.

Once connecting member 4, pad 7 and sleeve 8 are formed separately, the sleeve is fitted with a small amount of interference onto straight portion 3 of bar 2. Alternatively, sleeve 8 may, as stated, be molded directly onto bar 2, and may of course be made angularly integral with stabilizing bar 2 in ways other than those described (interference fit or direct molding).

Annular pad 7 is then fitted about sleeve 8 by sliding sleeve 8 with respect to pad 7, which is aided by bevels 47 on radial projections 38 of sleeve 8. When so doing, pad 7 is slightly deformed circumferentially to get past radial projections 38, which are also deformed by the passage of pad 7 until this reaches seats 41, at which point, pad 7 is locked axially by pairs of shoulders 42, 43 cooperating with annular end edges 44, 45 of pad 7, but is permitted to rotate with respect to sleeve 8 by being fitted to the sleeve with a small amount of radial clearance. As stated, pad 7 may comprise two separate bodies 15, 16, which may be fitted separately about sleeve 8 and possibly welded to each other.

Finally, connecting member 4 is fitted to pad 7, which is thus interposed radially between connecting member 4 and antifriction sleeve 8, which in turn is interposed between pad 7 and straight portion 3 of bar 2. Aligning grooves 13, 14 of cavity 6 of connecting member 4 with projections 18, 19 of pad 7, pad 7 is slid with respect to connecting member 4, and with the aid of bevels 35 on projections 18, 19, to fit connecting member 4 inside seats 26, so that pad 7 is locked axially with respect to connecting member 4 by pairs of shoulders 28, 29 cooperating with annular end edges 30, 31 of connecting member 4, and is locked angularly with respect to connecting member 4 by projections 18, 19 engaging grooves 13, 14.

In the event pad 7 comprises two bodies 15, 16, as described, detachment of the bodies, in use, is prevented by connecting member 4 surrounding and holding circumferentially pad 7.

In a preferred embodiment, radial projections 24 of annular pad 7 and radial projections 38 of sleeve 8 with respective face bevels 35 and 47 are smaller radially than the opposite radial projections 25, 39, and the actual axial stop function is performed, as explained later on, by shoulders 29, 43 defined by projections 25, 39.

Device 1 as described provides for obtaining, cheaply and easily according to the invention, an effective vehicle stabilizing system permitting not only rotation of the bar with respect to the vehicle fasteners (optimum operating condition) but also correct axial positioning of the bar.

FIG. 2 shows a stabilizing bar 2 of the type described, extending crosswise to the vehicle to connect the wheels of the same axle, and on which is formed a stabilizing system 51 comprising a pair of devices 1 as described.

Each device 1, like the one already described, is connected to a respective straight portion 3 of bar 2; and each antifriction sleeve 8 of the devices is integral with bar 2 but connected in rotary manner to respective pad 7, which is angularly integral with respective connecting member 4, so that bar 2 rotates freely with respect to connecting member 4 and is connected in rotary manner to the vehicle. The two devices 1 are fitted to respective straight portions 3 of bar 2 (which may of course coincide) specularly with respect to the center line of the vehicle, so that bar 2 is locked axially with respect to connecting members 4 and therefore positioned correctly. That is, using a pair of supporting devices 1 arranged as described, axial shoulders 43 defined by radial projections 39 of the two antifriction sleeves 8 face opposite ways, as do axial shoulders 29 defined by radial projections 25 of the two annular pads 7, so that bar 2 is locked axially with respect to connecting members 4, and therefore with respect to vehicle structure 5, by pairs of opposite shoulders 29 and 43 of the two devices 1, located symmetrically with respect to the center line of the vehicle. Conversely, shoulders 28 and 42, defined respectively by radial projections 24 of annular pad 7 and radial projections 38 of sleeve 8 having face bevels 35 and 47, are not called upon to withstand axial loads, and may therefore be made smaller so as not to excessively deform pad 7 when this is inserted inside respective seats 41.

Clearly, changes may be made to the device as described above without, however, departing from the scope of the accompanying claims.

For example, annular pad 7 may, in turn, be molded onto connecting member 4, in which case, the only click-on elements would be antifriction sleeve 8 and pad 7, so that angular locking means 21 (projections 18, 19 of pad 7 and respective grooves 13, 14 of connecting member 4) for angularly locking pad 7 with respect to connecting member 4, and axial-stop means 32 (radial projections 24, 25) may obviously be dispensed with.

The way in which annular pad 7 clicks onto connecting member 4 and sleeve 8 may obviously also differ from that described. For example, sleeve 8 may be inserted inside a seat formed on the inner lateral surface of pad 7 (and not vice versa, as described); or the positions of projections 18, 19 and respective grooves 13, 14 may be inverted, grooves 13, 14 being formed on the outer lateral surface 20 of pad 7, and projections 18, 19 on the inner lateral surface 12 of connecting member 4.

What is claimed is:

1. A device for supporting and positioning a vehicle stabilizing bar having at least one straight portion, the device comprising:

a connecting member for connecting said bar to a vehicle supporting structure, the connecting member being made of a substantially rigid material and having a substantially cylindrical through cavity housing said straight portion of the bar;

an annular pad made of elastomeric material and interposed radially between said connecting member and said straight portion of the bar;

and an antifriction sleeve made of a low-friction polymeric material and radially engaged with said straight portion of the bar;

said antifriction sleeve, said annular pad and said connecting member defining three members at least partially inserted one radially inside another;

said annular pad being interposed radially between said connecting member and said antifriction sleeve and being connected frictionally, in a rotating manner, to said antifriction sleeve, at least two of said three members being snap-on connected axially to each other, wherein the device further comprises angular locking means for angularly locking said annular pad with respect to said connecting member, said angular locking means comprising at least one longitudinal projection projecting radially from an outer lateral surface of the annular pad and engaging at least one corresponding longitudinal groove formed on an inner lateral surface of the connecting member.

2. The device as claimed in claim 1, wherein said connecting member is a one-piece member made of relatively rigid polymeric material and comprising fastening means for fitment to said vehicle supporting structure, and said through cavity inside which said annular pad is inserted; said device also comprising first axial-stop means for axially arresting said annular pad with respect to said connecting member, and second axial-stop means for axially arresting said antifriction sleeve with respect to said annular pad.

3. The device as claimed in claim 1, wherein said annular pad further comprises, on said respective outer lateral surface, at least one first seat in which to click said connecting member.

4. The device as claimed in claim 1, wherein said at least one longitudinal projection of the annular pad comprises, at respective longitudinal ends, respective first radial projections facing each other, axially defining said first seat in which to click said connecting member, and defining a first pair of facing axial shoulders cooperating axially with respective annular end edges of said connecting member.

5. The device as claimed in claim 4, wherein one axial end of said at least one longitudinal projection of said annular pad comprises a first face bevel defining a lead-in to assist click-in insertion of said connecting member into said first seat.

6. The device as claimed in claim 4, wherein said annular pad comprises a pair of diametrically opposite longitudinal projections, and said connecting member comprises a pair of diametrically opposite longitudinal grooves; each of said longitudinal projections engaging one of said longitudinal grooves.

7. The device as claimed in claim 1, wherein said antifriction sleeve is molded onto said straight portion of the bar, and comprises, on a respective outer lateral surface thereof, at least one second seat in which to click said annular pad.

8. The device as claimed in claim 7, wherein said antifriction sleeve comprises at least a pair of second radial projections, which are located at respective longitudinal ends of said antifriction sleeve, project radially from said outer lateral surface of the antifriction sleeve, are positioned facing each other, axially define said second seat in which to click said annular pad, and define a second pair of facing axial shoulders cooperating axially with respective annular end edges of said annular pad.

9. The device as claimed in claim 8, wherein one of said second radial projections, located at a first (36) of said longitudinal ends of the antifriction sleeve, comprises a second face bevel defining a lead-in for assisting click-in insertion of said annular pad into said second seat; said second face bevel facing the opposite way to said first face bevel.

10. The device as claimed in claim 8, wherein said antifriction sleeve comprises two diametrically-opposite pairs of second radial projections.

11. The device as claimed in claim 1, wherein said annular pad is molded onto said connecting member.

12. A vehicle stabilizing bar having at least one straight portion for seating at least one connecting member for fitment to a vehicle, the vehicle stabilizing bar comprising at least one supporting device, said at least one supporting device comprising:

a connecting member for connecting said bar to a vehicle supporting structure, the connecting member being made of a substantially rigid material and having a substantially cylindrical through cavity housing said straight portion of the bar;

an annular pad made of elastomeric material and interposed radially between said connecting member and said straight portion of the bar; and an antifriction sleeve made of a low-friction polymeric material and radially engaged with said straight portion of the bar; said antifriction sleeve, said annular pad and said connecting member defining three members at least partially inserted one radially inside another; said annular pad being interposed radially between said connecting member and said antifriction sleeve and being connected frictionally, in a rotating manner, to said antifriction sleeve, at least two of said three members being snap-on connected axially to each other, wherein the device further comprises angular locking means for angularly locking said annular pad with respect to said connecting member, said angular locking means comprising at least one longitudinal projection projecting radially from an outer lateral surface of the annular pad and engaging at least one corresponding longitudinal groove formed on an inner outer lateral surface of the connecting member.

13. A vehicle stabilizing system comprising:

at least one stabilizing bar having at least one straight portion and connecting the wheels of a common axle; and a pair of supporting devices for supporting said bar and connecting said bar to the vehicle body, said straight portion of the bar seating said pair of supporting devices, said pair of supporting devices located symmetrically with respect to the center line of the vehicle, each supporting device comprising:

a connecting member for connecting said bar to a vehicle supporting structure, the connecting member being made of a substantially rigid material and having a substantially cylindrical through cavity housing said straight portion of the bar;

an annular pad made of elastomeric material and interposed radially between said connecting member and said straight portion of the bar; and an antifriction sleeve made of a low-friction polymeric material and radially engaged with said straight portion of the bar; said antifriction sleeve, said annular pad and said connecting member defining three members at least partially inserted one radially inside another; said annular pad being interposed radially between said connecting member and said antifriction sleeve and being frictionally connected, in a rotating manner, to said antifriction sleeve, at least two of said three members being snap-on connected axially to each other, wherein the device further comprises angular locking means for angularly locking said annular pad with respect to said connecting member, said angular locking means comprising at least one longitudinal projection projecting radially from an outer lateral surface of the annular pad and engaging at least one corresponding longitudinal groove formed on an inner lateral surface of the connecting member.

* * * * *